US009326282B1

(12) United States Patent
Oroskar

(10) Patent No.: US 9,326,282 B1
(45) Date of Patent: Apr. 26, 2016

(54) ADJUSTMENT OF ACCESS PARAMETERS BASED ON THE CODEC ASSOCIATED WITH A WIRELESS COMMUNICATION DEVICE

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 276 days.

(21) Appl. No.: 13/734,786

(22) Filed: Jan. 4, 2013

(51) Int. Cl.
*H04W 72/00* (2009.01)
*H04W 72/04* (2009.01)

(52) U.S. Cl.
CPC .................................. *H04W 72/044* (2013.01)

(58) Field of Classification Search
CPC ..... H04W 8/245; H04W 8/183; H04W 82/02; H04W 8/18; H04W 8/12; H04W 60/00; H04W 60/04; H04W 48/15; H04W 48/16; H04W 48/18; H04W 36/30; H04W 24/00; H04W 72/082; H04W 28/04
USPC ........ 455/418, 450, 451, 452.1, 452.2, 432.1, 455/432.2, 432.3, 433, 434, 435.1, 435.2, 455/435.3; 370/252
See application file for complete search history.

(56) References Cited

U.S. PATENT DOCUMENTS

| | | | | |
|---|---|---|---|---|
| 7,821,953 | B2 * | 10/2010 | Yarlagadda et al. | 370/252 |
| 8,254,930 | B1 * | 8/2012 | Mauer et al. | 455/436 |
| 8,483,699 | B1 * | 7/2013 | Oroskar | 455/450 |
| 8,750,231 | B1 * | 6/2014 | Oroskar et al. | 370/329 |
| 8,798,622 | B1 * | 8/2014 | Oroskar | 455/435.1 |
| 2002/0114284 | A1 * | 8/2002 | Kronestedt et al. | 370/252 |
| 2005/0135272 | A1 * | 6/2005 | Vigoureux et al. | 370/254 |
| 2011/0153805 | A1 * | 6/2011 | Beninghaus et al. | 709/224 |
| 2011/0294501 | A1 * | 12/2011 | Wang et al. | 455/426.1 |
| 2013/0308579 | A1 * | 11/2013 | Pulugurta | 370/329 |

OTHER PUBLICATIONS

3rd Generation Partnership Project 2 "3GPP2", "Enhanced Variable Rate Codec, Speech Service Options 3, 68, 70, and 73 for Wideband Spread Spectrum Digital Systems", Version 2.0, Jan. 25, 2010, 308 pages.

\* cited by examiner

*Primary Examiner* — Allahyar Kasraian

(57) ABSTRACT

Embodiments may involve the adjustment of access parameters for a wireless communication device (WCD), based on the codec that is currently associated with the WCD. An illustrative method involves a WCD: (a) determining a codec that is associated with the WCD in a given coverage area, (b) using the associated codec as a basis for determining a setting for each of one or more access parameters for an access process of the WCD, and (c) operating according to the determined settings for the one or more access parameters.

20 Claims, 4 Drawing Sheets

|  | ITP Weighting Factor 402 | Probe-Power Increase 404 | Maximum Probe 406 | Maximum Cycle 408 | Access-Probe Timer Duration 410 |
|---|---|---|---|---|---|
| COP 0 | 1.3 | 7 dB | 10 | 5 | 3 |
| COP 1 – 3 | 1.1 | 6 dB | 8 | 4 | 2 |
| COP 4 | 1.0 | 5 dB | 4 | 3 | 1 |
| COP 5-7 | 0.8 | 3 dB | 3 | 2 | 1 |

Fig. 4

ADJUSTMENT OF ACCESS PARAMETERS BASED ON THE CODEC ASSOCIATED WITH A WIRELESS COMMUNICATION DEVICE

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other WCD that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

When a RAN receives an incoming communication for a WCD, the RAN typically pages the WCD via a paging channel in at least the coverage area in which the WCD last registered. When a cellular wireless communication system seeks to page a WCD (e.g., for an incoming call or for some other reason), a switch in the network may send the page message to numerous base stations in the switch's coverage area, with the hope that when the base stations broadcast the page message, the WCD will receive the page message in one of the associated sectors, and will respond. Furthermore, to increase the chances that a WCD receives a page, a RAN may re-send a page, possibly multiple times, in the event that an attempt to page a WCD fails.

Once a WCD is successfully paged, the RAN and WCD typically proceed to set up a forward-link traffic channel between the BTS and the WCD, via which the RAN can communicate with the WCD. As part of this process, the RAN determines the transmit power to use for forward-link traffic. To do so, the RAN may first transmit at an initial transmit power, which is typically a constant power level that is preset at the RAN. The WCD then evaluates the forward-link signal quality, such as by determining the frame error rate (FER), and reports back to the RAN. Then, depending on the signal quality, the RAN may increase or decrease the transmit power by a predetermined increment. The RAN and WCD may then repeat this process until a satisfactory signal quality is achieved.

Further, for certain types of communication, such as voice calls, video calls, and/or other types of calls, a WCD may be able to use two or more different types of codecs when engaging in such communication. However, each codec may have different characteristics that impact the extent of resources used when the WCDs are communicating.

Overview

An exemplary method may be implemented by a wireless communication device (WCD) in an effort to increase or decrease the likelihood that a connection to a radio access network (RAN) is successfully established for a communication, according to the quality of the codec that is assigned or is likely to be assigned for the communication.

In an exemplary embodiment, a wireless communication device (WCD) may support various types of codecs. These codecs may define how media content (e.g., voice, music, still images, and/or video) are encoded and decoded. Different codecs may have different features. For instance, a voice codec used by a WCD might encode and decode digital voice at a rate of 1 to 15 kilobits per second. However, to achieve these bit rates, some of the information present in an input analog voice signal (e.g., high-frequency spectral components) may be lost when digitized. Thus, codec design can be a tradeoff between achieving a low bit rate for a particular type of media (which is desirable to conserve network and storage capacity) and the user-perceived quality of the media produced by the codec, which typically improves as more bandwidth is utilized.

Herein, a characterization of the quality provided by a codec should be understood to indicate the quality of the media produced by that codec. For instance, a "high-quality codec" should be understood as being a codec that generally produces media of a higher quality (as compared to some other codec that generally produces media of a lower quality).

There may be various scenarios where a radio access network (RAN) assigns a codec to a given WCD, such as during call setup and/or when paging a WCD. When the RAN assigns a codec, the RAN may select from two or more different codecs that are supported by the given WCD. Since wireless spectrum is limited, it may benefit wireless network operators to allocate wireless resources judiciously, and codec selection and assignment is an opportunity to do so. Therefore, when multiple codecs are supported by a particular WCD, a RAN may be configured to consider various factors when determining which codec to assign to the WCD, such as factors indicating the utilization of network resources in the sector where the WCD is located.

Since codecs may be assigned based on the utilization of network resource in a given sector (e.g., based on load of the traffic channels), a WCD may interpret a codec that was recently assigned to the WCD, as an indication of the network usage in the coverage area where the codec was assigned. For instance, the fact that a high-quality codec was assigned in a given coverage area may indicate a lower network-usage level in the coverage area, and vice versa. Further, certain access parameters, such as those affecting the transmission of access probes by a WCD, may increase or decrease the amount of network resources used by a WCD when establishing a connection to the RAN for a communication.

Accordingly, exemplary embodiments may help to manage the usage of network resources by helping a WCD to adjust certain access parameters, based on the codec that was most-recently assigned to the WCD. In particular, a WCD may determine settings for access parameters so as to increase or decrease the amount of resources it is likely to use for an access process in a given coverage area, depending upon whether the most-recently assigned codec in the coverage area is indicative of higher or lower usage of network resources, respectively.

In another aspect, it may be desirable for a WCD to successfully connect to the RAN in a coverage area where it is likely to be assigned a high-quality codec. Further, a WCD may interpret the fact that the WCD was recently assigned a high-quality codec for a previous communication in a sector as an indication that the WCD will likely be assigned a high-quality codec for a new communication. Accordingly, exemplary embodiments may additionally or alternatively help a WCD to determine settings for access parameters that increase the likelihood of the WCD successfully connecting to the RAN in a coverage area where the most-recently assigned codec was a high-quality codec. It should be understood, however, that exemplary embodiments may provide benefits, and be implemented for purposes, other than those described herein.

In one aspect, an exemplary method involves a WCD: (a) determining a codec that is associated with the WCD in a given coverage area; (b) using the associated codec as a basis for determining a setting for each of one or more access parameters for an access process of the WCD; and (c) operating according to the determined settings for the one or more access parameters.

In another aspect, anon-transitory computer readable medium may have stored therein instructions that are executable to cause a RAN to perform functions comprising: (a) determining a codec that is associated with a WCD in a given coverage area; (b) using the associated codec as a basis for determining a setting for each of one or more access parameters for an access process of the WCD; and (c) causing the WCD to operate according to the determined settings for the one or more access parameters.

In a further aspect, an exemplary WCD may include a non-transitory computer-readable medium and program instructions stored on the non-transitory computer-readable medium. The program instructions may be executable by at least one processor to: (a) determine a codec that is associated with the WCD in a given coverage area; (b) use the associated codec as a basis for determining a setting for each of one or more access parameters for an access process of the WCD; and (c) operate according to the determined settings for the one or more access parameters.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 4 is a table indicating, for various codecs, corresponding settings of various access parameters, according to an exemplary implementation.

DETAILED DESCRIPTION

Figure 1:
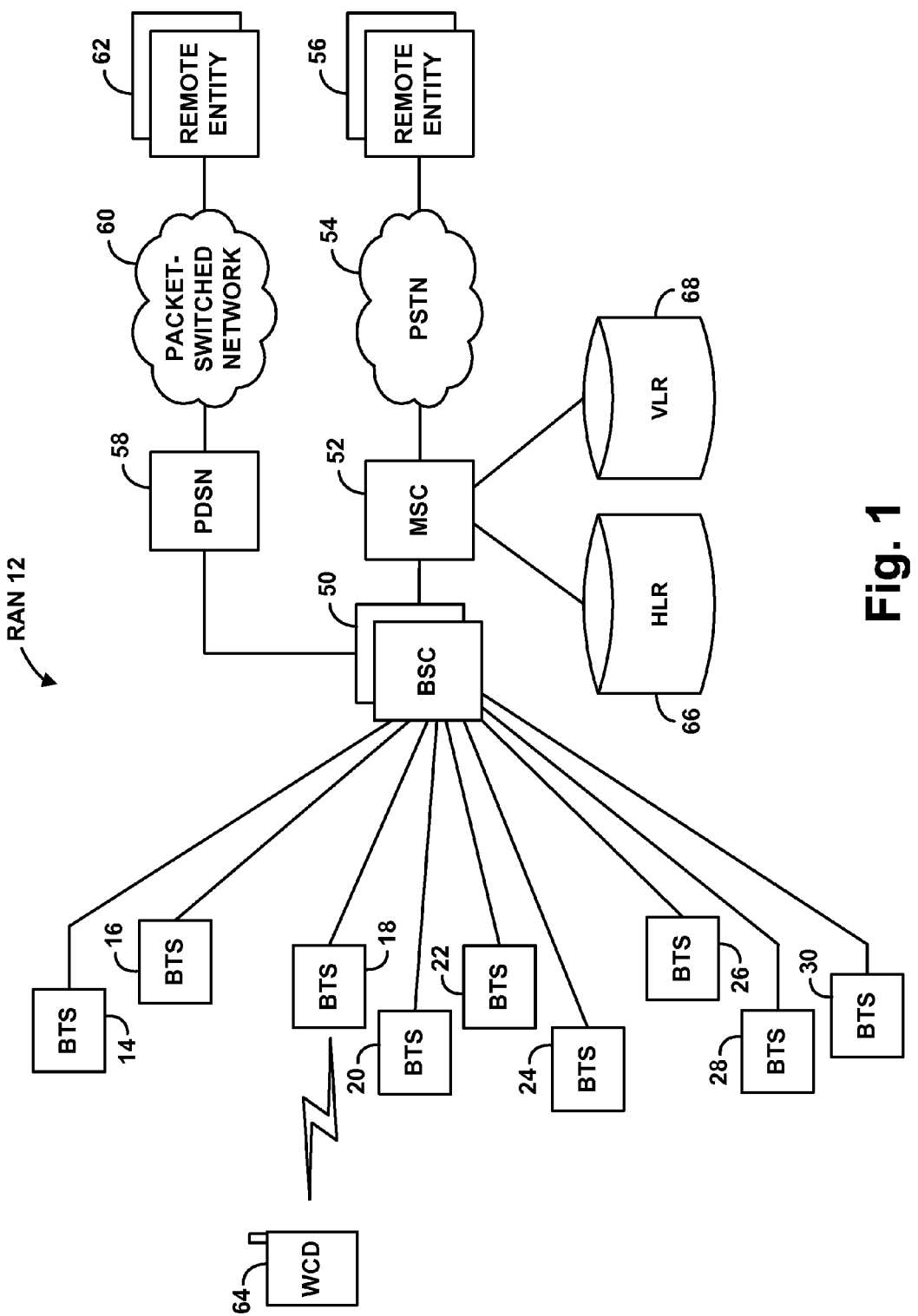
FIG. 1 is a simplified block diagram of a wireless communication network in which an exemplary method can be implemented.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. EXEMPLARY COMMUNICATION NETWORKS

Referring to the drawings, as noted above, FIG. 1 is a simplified block diagram of a wireless communication network in which an exemplary method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

As shown in FIG. 1, the exemplary network includes at its core a radio access network (RAN) 12 that radiates to define numerous coverage areas in which wireless communication devices (WCDs) can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1×RTT, 1×EV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas to communicate with WCDs in those coverage areas. The coverage areas can be cell sites, cell sectors, or some other defined wireless coverage area (possibly even a combination of coverage provided by multiple base stations).

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example, which could be a cell phone, wirelessly equipped personal digital assistant (PDA), or any other type of wirelessly-equipped device now known or later developed. The WCD is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above. Further, WCD may include a user interface, which typically includes components for receiving input from a user of WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Each WCD, such as WCD 64, typically has at least one associated identifier that uniquely identifies the WCD. By way of example, a WCD may have a unique mobile directory number (MDN), a unique International Mobile Subscriber Identity (IMSI), a unique MAC address, or some other identifier dynamically or statically assigned to the WCD, which may serve as its address for receiving air interface communications transmitted to it by the RAN. As a specific example, an IMSI is a unique number associated with the WCD, typically taking the form of the WCD's phone number. Additionally or alternatively, each WCD may be assigned a mobile identification number (MIN).

To keep track of where WCDs, such as WCD 64 are operating, a RAN 12 may include a visitor location register (VLR) 68 and a home location register (HLR) 66, as shown in FIG. 1. VLR 68 may include information related to WCDs that are currently being served by MSC 52, while HLR 66 may include information related to all WCDs that utilize RAN 12.

In a further aspect, each WCD may have a service profile stored in the HLR 66 and/or in the VLR 68 that corresponds to the MSC 52 that is currently serving a WCD 64. Each MSC 52 may be coupled to the HLR 66 and or its VLR 68 by an out of band signaling network such as a Signaling System #7 (SS7) network, for instance, and may thus access the service profile for a WCD using an identifier for the WCD, such as its MIN, MDN, and/or IMSI.

VLR 68 and/or HLR 66 may obtain information regarding the locations of WCDs through registration messages that the WCDs transmit at various times. For example, a WCD might transmit a registration message that identifies its current cell-sector when the WCD first powers-up, at regular time intervals thereafter (e.g., every 10 minutes), and in response to other triggers (such as moving a certain distance or moving into a different paging zone). These registration messages could be received by VLR 68 and HLR 66. In this way, VLR 68 and HLR 66 may maintain location for each WCD in its service area (which could be, for VLR 68, the area served by MSC 52 and, for HLR 66, all areas served by RAN 12). The location information for a WCD could include an identification of the cell-sector that the WCD reported in its most recent registration message and the date/time of the most recent registration message. HLR 66 and/or VLR 68 could also maintain other types of location information for WCDs.

II. ACCESSING A NETWORK

When a WCD 64 seeks to, as examples, originate a CDMA communication session (e.g. a voice call) or respond to a CDMA page message from a base station, the WCD may send one or more messages known as access probes to the base station over a reverse-link CDMA access channel. As part of this process, the WCD may determine a transmit power level at which to send communications to the base station.

To arrive at an appropriate transmit power for communications, a WCD 64 typically determines an initial power level at which to send an initial access probe, and then transmits the access probe. If the base station (e.g., a BTS 14-30) does not acknowledge the initial access probe, the WCD 64 then retransmits the access probe at an incrementally higher power level (e.g., 3 dB higher than the previous access probe). The WCD 64 repeats this process (i.e., incrementally increasing the power level and re-transmitting) until either receiving an acknowledgement from the base station or reaching a set number (e.g., five) of transmitted access probes. The WCD 64 may then wait a timeout period, and start again at the initial power level. The WCD may repeat this entire cycle a set number of times (e.g., three) before concluding that the base station is not reachable, or perhaps waiting a longer timeout period before starting the entire sequence over. (It should be noted that variations on this access-probe-sending sequence exist as well, as this description is merely an example.)

Herein, the initial power level used for the initial attempt to send an access probe may be referred to herein as the "initial transmit power." The amount by which a WCD 64 increases its transmit power upon each successive attempt in an access-probe cycle may be referred to herein as the "probe-power-increase amount." Furthermore, the power level that is ultimately determined to be appropriate for reverse-link communications (e.g., the transmit power used to send the access probe when an acknowledgement approving the transmit power is received from the base station), is referred to herein as the "verified transmit power."

Further, as used herein, the "maximum probe number" may refer to the maximum number of access probes that a WCD 64 can send in each access-probe cycle. Yet further, the "maximum cycle number," as used herein, may refer to the maximum number of times a given WCD 64 may repeat the access-probe cycle described above. In addition, the term "access-probe timer" may be used herein to refer to a timer that specifies the period of time that a WCD 64 waits between attempts to send an access-probe during a given access-probe cycle.

In some embodiments, a WCD may implement the IS-2000 open-loop power-control process, which involves the WCD determining an initial transmit power in decibels (dB), and then sending an access probe at the determined initial transmit power. Then, if no acknowledgement is received, WCD 64 may increase its transmit power and retransmit the access probe until either an acknowledgment is received, or the attempt to connect is deemed to have failed (e.g., after a certain number of attempts without acknowledgement or after a predetermined timeout period has elapsed without acknowledgement). When an acknowledgement is received, the WCD may sets its transmit power for reverse-link transmissions equal to the transmit power used for the most-recent access-probe attempt. The WCD may then update its reverse-link transmit power as needed, using feedback from the RAN that is provided according to closed-loop power control.

In practice, a WCD operating under IS-2000 may determine the initial transmit power (ITP) at which the WCD transmits the initial access probe during the open-loop power control as follows:

$$ITP = -(RSSI) - 76 + (Nom\_Pwr) + Probe\_Adj\_Pwr + E_c/I_o\_Correction$$

In the above calculation, the Received Signal Strength Indicator (RSSI) is typically an indication of received signal strength at the WCD, as measured by the WCD. A WCD may determine RSSI using techniques that are well known to those skilled in the art. The Nominal Power (Nom_Pwr) is typically a network setting that is determined by the BSC or another network entity and relayed to a WCD in a page message that is transmitted when the WCD powers on. In practice, Nom_Pwr typically is set to a constant value ranging from zero and three. The Probe Adjust Power (Probe_Pwr_Adj) parameter is typically a constant that is predefined by the service provider, and is also provided to a WCD by the access network. Further, the $E_c/I_o$ Correction parameter helps correct for interference, and may be based on the interference experienced on the forward link ($E_c/I_o$).

To facilitate access by WCDs, a RAN 12 may broadcast an access parameters message in each coverage area it serves. The access parameters message and/or other such overhead messages for a given coverage may indicate settings for certain access parameters to be used by WCDs in the coverage area, such as some or all of the access parameters described herein. For example, in some embodiments, an access parameters message could explicitly indicate an ITP to be used by WCDs, a maximum number of attempts to send an access probe per cycle, a maximum number of cycles before deeming an access process unsuccessful, and/or other access parameters. Further, the access parameters message and/or other such overhead messages may provide information that can be used by WCDs in the coverage area to determine individual settings for certain access parameters. For example, the access parameters message could include values for Nom_Pwr or Probe_Pwr_Adj, which a WCD could use to determine its ITP. Other examples are also possible.

III. EXEMPLARY CODECS

A RAN 12 and/or a WCD 64 may use various types of codecs to encode and/or decode a voice call and/or other types of communications. A codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may include the same (or a similar) voice codec to decode the utterance from the particular format so that the destination WCD can play out the resulting signal.

In general, there may be a roughly linear relationship between codec bit rate and the media quality (e.g., the voice quality) that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of codecs, several different voice codecs are compared and contrasted below. In an exemplary embodiment, CDMA wireless networks may use one or more codecs from the Enhanced Variable Rate Codec (EVRC) family.

For instance, the EVRC-A codec operates on input speech signals sampled with 16-bit resolution 8,000 times per second (i.e., a sampling rate of 8,000 Hz). The resulting 128 kilobit per second stream is divided into 20 millisecond frames, each of which is compressed to either 171 bits (8.55 kilobits per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec, which may also be referred to as CMDA service option (SO) 73, supports some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB.

To support both EVRC-B and EVRC-WB, EVRC-NW includes eight capacity operating points (COPs), which may be referred to as EVRC-NW COP 0 to COP 7, or simply as COP 0 to COP 7. Under EVRC-NW, COP 0 is a rate 1 wideband voice encoder. Further, EVRC-NW COP 4 is a narrowband voice encoder as defined under EVRC-B. EVRC-NW COPs 1 to 3 are narrowband voice encoders that provide higher voice quality as compared to EVRC-B, with COP 1 providing the greatest improvement over EVRC-B. Further, EVRC-NW COPs 5 to 7 are narrowband voice encoders that provide lower voice quality as compared to EVRC-B, with COP 5 being the closest to EVRC-B in quality.

In an exemplary embodiment, a RAN 12 may be configured to determine which codec or codecs are supported by a given WCD, and to assign one of the supported codecs to the WCD to use for a given communication. The RAN 12 may determine the codec or codecs that are supported by a particular WCD in various ways. For example, when a WCD 64 originates a call, the WCD 64 may transmit an origination message to the RAN 12. This origination message may include an indication of the service options supported by the WCD 64. For instance, the origination message may include the WCD's preferred service option (e.g., service option 73) as well as one or more auxiliary service options (e.g., service option 3 and/or service option 68) that the WCD also supports.

Further, for a WCD receiving a call (e.g., a callee WCD), the RAN may store or have access to a profile that includes indications of the service options supported by the WCD. This profile may also specify the WCD's preferred service option as well as one or more auxiliary service options that the WCD also supports. Thus, for an incoming call to a callee WCD, the RAN may receive an indication that a call has arrived at the RAN for the callee WCD, access the profile of the callee WCD to determine the supported codecs, and based on various factors discussed in more detail below, determine which codec to assign to the callee WCD for the call.

In some embodiments, the HLR and/or the VLR may indicate the service option capabilities for individual WCDs that have registered with the RAN. For example, the HLR and/or VLR may indicate that a particular WCD is configured for SO 73. In an exemplary embodiment, this may be interpreted as implying that the particular WCD is capable of using any of COP 1 to COP 7, and that a base station (e.g., a BTS), may negotiate whether the particular WCD is capable of COP 0 (i.e., HD Voice).

As such, before a BTS 18 pages a WCD 64 for a voice call, the BTS may coordinate with its serving MSC to access the VLR and determine which service options are supported by the WCD 64. Further, when a WCD that supports EVRC-NW (i.e. SO 73) acknowledges a page by sending the RAN 12 a page response message, the WCD may also indicate the particular operating points that are supported by the WCD in the page response message.

In an exemplary embodiment, a RAN may consider various factors when determining which codec should be assigned to a WCD for a given call. For example, in some embodiments, the RAN may consider the utilization of at least part of the RAN infrastructure. If the utilization of a wireless coverage area serving the WCD, a wireless coverage area that is likely to serve the WCD, a BTS, a BSC, and/or a backhaul link between any RAN and/or non-RAN components is too high, it may be preferable to instruct the WCD to use a codec with a lower expected bit rate, such as EVRC-A or EVRC-B. However, if this utilization—or utilizations—is not too high, it may be preferable to allow the WCD to use a codec that supports a higher expected bit rate, and thereby potentially increasing the media quality of the call. In this latter case, the RAN may instruct the WCD to use a codec with a higher expected bit rate, such EVRC-NW COP 0 or COP 1.

Once the RAN has assigned a codec to a WCD to use for a call, the RAN may notify the WCD of the assigned codec. For example, according to SO 73, a base station may send the WCD a Service Option Control message that includes the particular operating point that is assigned to the WCD for the call (e.g., one of COP 0 to COP 7). Other examples are also possible.

In some embodiments, a RAN may attempt to assign EVRC-NW COP 0 to all WCDs that support COP 0, unless the utilization of network resources in a coverage area is too high. This may be done in an effort to provide WCDs with the best call quality that is possible, and/or for other reasons. In the event that the utilization is too high, then the RAN may select a codec that provides lower quality, such as one of EVRC-NW COPs 1 to 7.

Determining whether the utilization is "too high" may be based on one or more utilization thresholds. For instance, the RAN may measure the utilization of a wireless coverage area serving the WCD and compare the measured utilization to a utilization threshold. If the measured utilization exceeds the utilization threshold, the RAN may instruct the WCD to use EVRC-B. Otherwise, the RAN may instruct the WCD to use EVRC-WB or EVRC-NW. The utilization threshold may be represented as a percentage, such as 30%, 40%, 50%, 60%, 70%, and so on.

It should be understood that the codecs described herein are only examples. Other voice or non-voice codecs may be used instead.

IV. EXEMPLARY COMPONENTS OF A WIRELESS COMMUNICATION DEVICE

Figure 2:
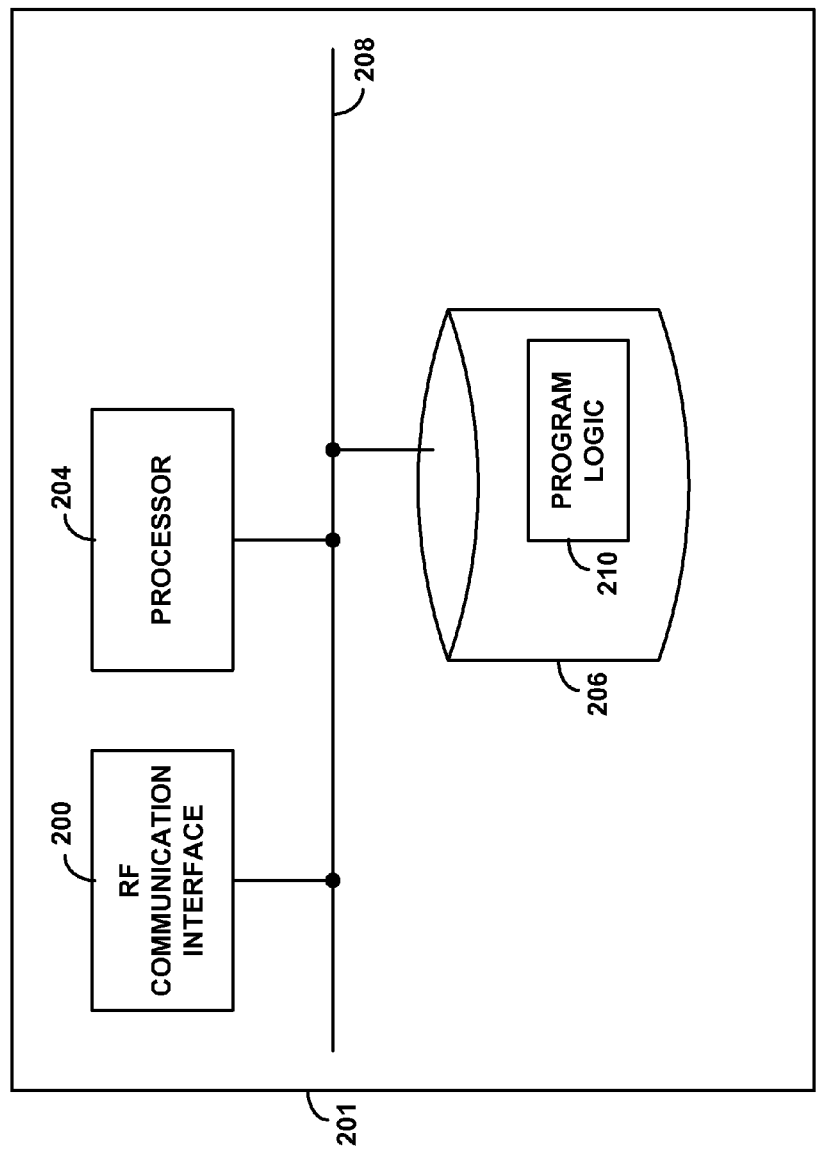
FIG. 2 is a simplified block diagram showing functional components of a wireless communication device, according to an exemplary embodiment.

FIG. 2 is a simplified block diagram showing functional components of a WCD 201, according to an exemplary embodiment. As shown, the WCD 201 may include an RF communication interface 200, a processor 204, and data storage 206, all of which may be communicatively linked together by a system bus 208, or by one or more other connection mechanisms. In practice, WCD 201 may take the form of a cell phone, personal digital assistant, wirelessly equipped computer, or any other computing device that is operable to support communications via a connection to a RAN.

In WCD 201, RF communication interface 200 may include and/or interface with one or more antenna structures, one or more power amplifiers, and associated equipment, for engaging in RF communication with BTSs of a RAN, according to one of the air interface protocols noted above for instance. Processor 204 may take the form of one or more processors (e.g., general purpose and/or special purpose processors), such as microprocessors for instance. Further, data storage 206 may take the form of or include one or more volatile and/or non-volatile storage components, such as magnetic, optical, or organic storage components, integrated in whole or in part with processor 204. As further shown, data storage 206 may include program logic 210 (e.g., program instructions) that are executable by processor 204 to carry out various functions, such as the functionality of WCDs described herein.

In an exemplary embodiment, program logic 210 may be executable by processor 204 to: (a) determine a codec that is associated with the WCD in a given coverage area, (b) use the associated codec as a basis for determining a setting for each of one or more access parameters for an access process of the WCD, and (c) cause the WCD to operate according to the determined settings for the one or more access parameters.

V. EXEMPLARY METHODS

Exemplary methods may be carried out by a WCD (e.g., by a component or components of a WCD) to help manage usage of network resources during an access process, in an effort to improve the likelihood of successfully establishing a connection in a coverage area where a high-quality codec is likely to be assigned. It should be understood, however, that exemplary methods may be implemented by other types of computing devices and/or for other purposes, without departing from the scope of the invention.

Figure 3:
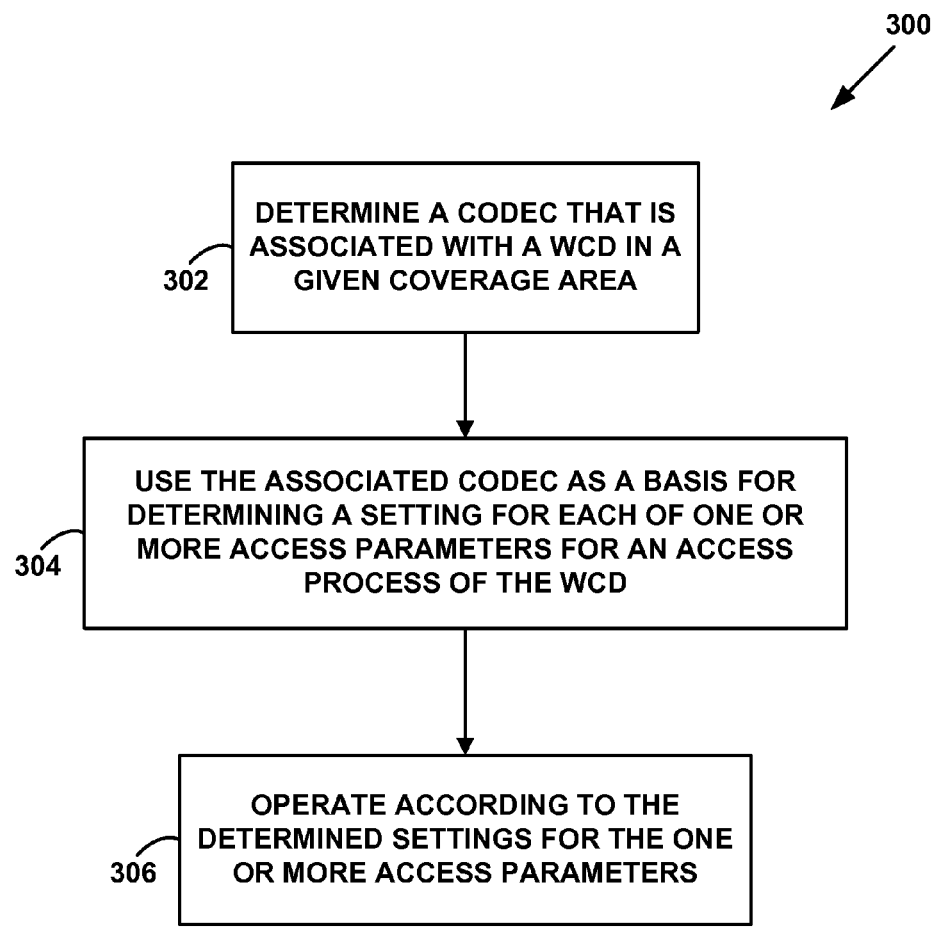
FIG. 3 is a flow chart illustrating a method, according to an exemplary embodiment.

FIG. 3 is a flow chart illustrating a method 300 that may be implemented by a WCD, according to an exemplary embodiment. Method 300 involves a WCD determining a codec that is associated with the WCD, as shown by block 302. The WCD may then use the associated codec as a basis for determining a setting for each of one or more access parameters for an access process of the WCD, as shown by block 304. The WCD can then operate according to the determined settings for the one or more access parameters, as shown by block 306. In particular, if and when the WCD seeks to connect to the RAN, the WCD may carry out the access process according to the determined settings for the one or more access parameters.

A. Determining the Associated Codec

As noted, block 302 involves the WCD determining a codec that that is associated with the WCD. To do so, the WCD may determine a codec that is likely to be assigned to the WCD in the coverage area where the WCD is currently operating.

In some embodiments, if the WCD was recently assigned a certain codec in a coverage area, then this may be taken as an indication that the WCD is more likely to be assigned that codec or a codec of similar quality for a new call in that coverage area. For instance, if the last-assigned codec for a WCD in a certain coverage area provides for a higher-quality voice call, then this may be interpreted as an indication that the WCD is likely to be assigned the same higher-quality codec for a new call (or at least a codec of a similar quality). Accordingly, block 302 may involve the WCD determining the "last-assigned codec," which may be the codec that was most-recently assigned to the WCD in the coverage area that the WCD is currently operating in. The WCD may then proceed to adjust its access parameters according to the quality of the last-assigned codec.

In other embodiments, block 302 may involve the WCD determining the codec that is currently assigned to the WCD in a given coverage area. For example, if a WCD is currently engaged in a voice call, then the WCD may consider the codec it is using for the voice call to be its associated codec, for purposes of carrying out method 300.

To facilitate performance of method 300, a WCD may store or have access to codec-assignment data that indicates its last-assigned and/or currently-assigned codec in one or more coverage areas. For example, whenever a base station instructs a WCD to use a certain operating point under EVRC-NW, the WCD may store a record of the operating point that is assigned to the WCD (e.g., one of EVRC-NW COPs 0 to 7), as well as an indication of the coverage area (e.g., the cell ID or sector ID) in which the operating point was assigned to the WCD. Thus, when a WCD is about to attempt to access a RAN in a certain coverage area, the may access its stored codec-assignment data to determine its last-assigned or currently-assigned codec in the coverage area.

In a further aspect, a WCD may evaluate its codec-assignment history in a coverage area, which may include more than one previously-assigned codec, when determining a codec that is likely to be assigned to it in a coverage area. To facilitate this functionality, the WCD may keep codec-assignment data for multiple previously-assigned codecs in each coverage-area. As such, block 302 of an exemplary method may involve the WCD determining a certain number of previously-assigned codecs, which were previously assigned to the WCD in the coverage area that the WCD is currently operating in, and determining the codec that is likely to be assigned to the WCD based on the combination of those previously-assigned codecs.

For example, a WCD that is configured for SO 73 could average the operating mode values (e.g., 0 to 7) for all previously-assigned codecs in a coverage, or average the operating mode values of a certain number of the most-recently assigned codecs (e.g., the two or three most recently assigned codecs). Further, in some embodiments, the WCD could determine a weighted average of a certain number of the most-recently assigned codecs. In particular, the WCD could determine a weighted average, where each previously-assigned codec is weighted according to recency (e.g., with more-recently assigned codecs being given greater weight). Other examples are also possible.

B. Determining Access Parameters Based on the Associated Codec

As noted above, block 304 may involve a WCD using its associated codec as a basis for determining a setting for each of one or more access parameters. Such access parameters may include, but are not limited to: (a) the maximum number of access probes per access-probe cycle, (b) the maximum number of access-probe cycles, (c) one or more transmit-power parameters for access probes, such as the initial transmit power and/or a probe-power-increase parameter, and/or (d) a duration parameter for consecutive access-probes. Other access parameters may additionally or alternatively be determined based on a WCD's associated codec, without departing from the scope of the invention.

FIG. 4 is a table 400 indicating, for various codecs, corresponding settings of various access parameters, according to an exemplary implementation. In particular, table indicates, for SO 73 COP 0 to COP 7, corresponding values of an initial transmit power (ITP) weighting factor 402, a probe-power-increase parameter 404, a maximum-probe parameter 406, a maximum-cycle parameter 408, and a duration parameter 408 for access-probe timers.

i. Initial Transmit Power

As noted above, block 304 may involve the WCD determining a setting for its initial transmit power. In an exemplary embodiment, the WCD may increase its initial transmit power to a higher power level when the WCD's associated codec is a higher-quality code, as compared to when the WCD's associated codec is a lower-quality codec.

For example, a WCD may initially receive a value for its initial transmit power from the RAN. The WCD can then multiply the initial transmit power value that is indicated by the RAN by a factor that increases or decreases the initial transmit power, depending upon whether the associated codec is a higher- or lower-quality codec, respectively. By increasing its initial transmit power when the last-assigned codec is a high-quality codec, the WCD may increase the likelihood that the RAN successfully receives the access probe in the coverage area where the WCD is more likely to be assigned a high-quality codec, and vice versa.

To illustrate possible settings for the ITP weighting factor, consider the implementation illustrated in FIG. 4. Specifically, as shown by the corresponding values of the ITP weighting factor 402 in table 400, the WCD could multiply the initial transmit power by a factor of 1.3 when its last-assigned codec was COP 0, by a factor of 1.1 when its last-assigned codec was one of COP 1 to COP 3, by a factor of 1.0 when its last-assigned codec was COP 4, and by a factor of 0.8 when its last-assigned codec was one of COP 5 to COP 7. Other examples are of course possible.

ii. Determining a Probe-Power-Increase Parameter

In some embodiments, a WCD may determine a setting for a probe-power-increase parameter based on its associated codec. In an exemplary embodiment, the probe-power-increase parameter indicates an amount by which the WCD should increase the transmit power upon each successive attempt to transmit an access probe in an access-probe cycle.

For example, the WCD may increase or decrease the value of the probe-power-increase parameter, depending upon whether the associated codec is a higher- or lower-quality codec, respectively. By increasing its transmit power adjustments for subsequent attempts when the last-assigned codec is a high-quality codec, the WCD may increase the likelihood that the RAN successfully receives an access probe in the coverage area where the WCD is more likely to be assigned a high-quality codec, and vice versa.

To illustrate possible settings for the probe-power-increase parameter, consider the implementation illustrated in FIG. 4. Specifically, as shown by the values of the probe-power-increase parameter 404 in table 400, the WCD could set the probe-power-increase parameter to 7 dB when its last-assigned codec was COP 0, such that the transmit power increases by 7 dB on each subsequent attempt to send an access probe. Further, the WCD could set the probe-power-increase parameter to 6 dB when its last-assigned codec was one of COP 1 to COP 3, to 5 dB when its last-assigned codec was COP 4, and to 3 dB when its last-assigned codec was one of COP 5 to COP 7. Other examples are of course possible.

iii. Determining a Maximum-Probe Parameter

In some embodiments, a WCD may set a maximum-probe parameter based on its associated codec. The value of the maximum-probe parameter may indicate the maximum number of access probes per access-probe cycle.

For example, a WCD may increase or decrease the value of the maximum-probe parameter according to whether the associated codec is a higher- or lower-quality codec, respectively. By doing so, the WCD may increase the maximum number of access probes it can send per cycle when the WCD is more likely to be assigned a high-quality codec (e.g., as indicated by the fact the last-assigned codec is a high-quality codec), and vice versa. As such, the WCD may increase the likelihood that the RAN successfully receives an access probe in the coverage area where the WCD is more likely to be assigned a high-quality codec.

To illustrate possible settings for the maximum-probe parameter, consider the implementation illustrated in FIG. 4. Specifically, as shown by the values of the maximum-probe parameter 406 in table 400, the WCD could set the maximum-probe parameter equal to 10 when its last-assigned codec was COP 0, such that a maximum of 10 probes can be sent per cycle. Further, the WCD could set the maximum-probe parameter equal to 8 when its last-assigned codec was one of COP 1 to COP 3, equal to 4 when its last-assigned codec was COP 4, and equal to 3 when its last-assigned codec was one of COP 5 to COP 7. Other examples are of course possible.

iv. Determining a Maximum-Cycle Parameter

In some embodiments, a WCD may set a maximum-cycle parameter based on its associated codec. The value of the maximum-cycle parameter may indicate the maximum number of access-probe cycles by a WCD, before it is determined that an access process has failed.

For example, a WCD may increase or decrease the value of the maximum-cycle parameter according to whether the associated codec is a higher- or lower-quality codec, respectively. By doing so, the WCD may increase the maximum number of access-probe cycles that are possible when the WCD is more likely to be assigned a high-quality codec (e.g., as indicated by the fact the last-assigned codec is a high-quality codec), and vice versa. As such, the WCD may increase the likelihood that the RAN successfully receives an access probe in the coverage area where the WCD is more likely to be assigned a high-quality codec.

To illustrate possible settings for the maximum-cycle parameter, consider the implementation illustrated in FIG. 4. Specifically, as shown by the values of the maximum-cycle parameter 408 in table 400, the WCD could set the maximum-cycle parameter to 5 when its last-assigned codec was COP 0, such that a maximum of five access probe cycles are possible. Further, the WCD could set the maximum-cycle parameter equal to 4 when its last-assigned codec was one of COP 1 to COP 3, equal to 3 when its last-assigned codec was COP 4, and equal to 2 when its last-assigned codec was one of COP 5 to COP 7. Other examples are of course possible.

v. Determining a Duration for the Access-Probe Timer

In some embodiments, a WCD may set the duration of an access-probe timer based on its associated codec. In an exemplary embodiment, this duration parameter indicates the duration for which the WCD waits between consecutive attempts to send an access probe.

For example, a WCD may increase or decrease the duration of the access-probe timer according to whether the associated codec is a higher- or lower-quality codec, respectively. In an exemplary embodiment, the WCD may increase the duration of the access-probe timer for higher-quality codecs, and vice versa. By allowing more time between consecutive attempts, the WCD may increase the likelihood that the network conditions that led to a failed attempt have changed by the time of the subsequent attempt. Thus, the WCD may increase the likelihood of successfully connecting in a coverage area where a higher-quality codec is more likely.

To illustrate possible settings for the access-probe duration parameter, consider the implementation illustrated in FIG. 4. Specifically, as shown by the values of the access-probe duration parameter 410 in table 400, the WCD could set the access-probe duration parameter to equal to 4 slots when its last-assigned codec was COP 0, such that the WCD waits for four time slots between consecutive attempts to send an access probe. Further, the WCD could set the access-probe duration parameter equal to 3 slots when its last-assigned codec was one of COP 1 to COP 3, and equal to 2 slots when its last-assigned codec was one of COP 4 to COP 7. Other examples are of course possible.

C. Additional Factors

In some embodiments, a WCD may also consider the "staleness" of the last-assigned codec, as well as its associated codec, when determining the setting for an access parameter. More specifically, if less time has elapsed between the assignment of the last-assigned codec and the time at which the WCD determines the setting for an access parameter, then the last-assigned codec may be considered a better indicator of the codec that is likely to be assigned to the WCD and/or considered a better indicator of the current loading in the sector. Accordingly, block 304 may involve the WCD using the elapsed time since the assignment of the last-assigned codec as a further basis for determining the setting for an access parameter.

As an example, the WCD may only change the value of an access parameter when the elapsed time is less than a threshold period of time. On the other hand, if the elapsed time is greater than the threshold period of time, then the WCD may simply use a default value for the access parameter. Other examples are also possible.

In another aspect, a WCD may also consider other timing factors, in conjunction with the last-assigned codec, when determining a setting for an access parameter. For example, a WCD may include or have access to data that indicates historical and/or predicted network usage in a coverage area. Such network-usage data may indicate historical network loading for traffic channels in the coverage area. As such, the WCD may utilize such usage-data to determine what the historical traffic-channel load has been at the current time of day and day of the week, for example. The WCD may then factor in the historical traffic-channel load when determining how to adjust an access parameter.

As an example, if the last-assigned codec is of lower-quality, thus indicating that the network was more heavily loaded, the WCD might typically set an access parameter in a manner that reduces, or at least does not increase, the likelihood of a WCD successfully accessing the network. However, if network-usage data indicates that traffic-channel load has historically been low at the time method 300 is being carried out (e.g., at the same time of day and/or the same day of the week), then the WCD might set the same access parameter in a manner that does not reduce the likelihood of a WCD successfully accessing the network by as much as it would without this information. Other examples in which a WCD considers the staleness of the last-assigned codec are also possible.

Further, a WCD may have access to network-usage data that indicates the historical rate of change in network loading at different times. Accordingly, a WCD may use such historical data to determine the rate at which the network load in a coverage area is expected to change at or near the time when method 300 is carried out (e.g., at the particular time of day and/or the particular day of the week). The WCD may then factor in the historical rate of change when determining the setting for an access parameter. For instance, the WCD could use the historical rate of change in combination with the elapsed time since the assignment of the last-assigned codec to determine how much weight the last-assigned codec should be given in the determination of an access-parameter setting.

For example, a WCD might increase or decrease the amount by which the associated codec affects a certain access parameter as the elapsed time since the assignment of the codec decreases or increases, respectively. Further, when the rate of change for network usage is slower, the last-assigned codec may be considered to a relatively good indicator of the codec that would be assigned at the present, and/or be considered to a relatively good indicator of current loading in the coverage area, for a longer period of time. Thus, the WCD may reduce or increase the effect of the elapsed time according to the expected rate of change at or near the time when method 300 is being carried out. In particular, the WCD may increase or decrease the weight given to the elapsed time when the rate of change is faster or slower, respectively.

VI. CONCLUSION

Exemplary embodiments of the present invention have been described above. Those skilled in the art will understand, however, that changes and modifications may be made to these embodiments without departing from the true scope and spirit of the invention, which is defined by the claims.

I claim:

1. A method comprising:
    determining, by a wireless communication device (WCD), a codec that is associated with the WCD in a given coverage area of a radio access network (RAN), wherein the RAN is configured to determine which codec is assigned to the WCD in the coverage area when the WCD establishes a connection in the given coverage area;
    using, by the WCD, the associated codec as a basis for determining a setting for each of one or more access parameters that affect a likelihood of a successful connection by the WCD in the given coverage area when using the one or more access parameters in an access process, wherein the setting for each of the one or more access parameters is determined such that the likelihood of a successful connection in the given coverage area is affected in a manner correlated to quality of the associated codec; and
    operating, by the WCD, according to the determined settings for the one or more access parameters.

2. The method of claim 1, wherein determining the codec that is associated with the WCD in the given coverage area comprises determining a codec that was last assigned to the WCD in the given coverage area.

3. The method of claim 1, wherein determining the codec that is associated with the WCD comprises determining a codec that is currently assigned to the WCD in the given coverage area.

4. The method of claim 1, wherein determining the codec that is associated with the WCD comprises determining a codec that is likely to be assigned to the WCD in the given coverage area.

5. The method of claim 4, wherein determining the codec that is likely to be assigned to the WCD comprises:
   determining one or more previously-assigned codecs that were previously-assigned to the WCD in the given coverage area; and
   based at least in part on the one or more previously-assigned codecs, determining the codec that is likely to be assigned to the WCD in the given coverage area.

6. The method of claim 4, further comprising using network usage data for the given coverage area a further basis for determining the codec that is likely to be assigned to the WCD.

7. The method of claim 6, wherein the one or more access parameters comprise an initial transmit power.

8. The method of claim 6, wherein the one or more access parameters comprise a probe-power increase parameter.

9. The method of claim 1, wherein the one or more access parameters comprise a maximum-probe parameter.

10. The method of claim 1, wherein the one or more access parameters comprise a maximum-cycle parameter.

11. The method of claim 1, wherein determining the setting for each of the one or more access parameters comprises determining a duration of an access-probe timer.

12. The method of claim 1, wherein operating according to the determined settings for the one or more access parameters comprises carrying out the access process according to the determined settings for the one or more access parameters.

13. The method of claim 1, further comprising:
   determining an elapsed time since assignment of the associated codec; and
   using the elapsed time as a further basis for determining the setting for at least one access parameter.

14. The method of claim 1, wherein the setting for each of the one or more access parameters is determined such that the likelihood of a successful connection increases or decreases, respectively, according to whether the quality of the associated codec is higher or lower, respectively.

15. The method of claim 1, further comprising:
   determining, by the WCD, a historical rate at which network load in the given coverage area is expected to change;
   determining, by the WCD, an elapsed time since assignment of the associated codec; and
   using both (a) the historical rate and (b) the elapsed time as a basis for determining the setting for each of the one or more access parameters.

16. The method of claim 1, further comprising performing the method of claim 1 for a plurality of coverage areas, so as to determine a respective associated codec and a respective setting for each of the one or more access parameters for each of the plurality of coverage areas, such that the likelihood of the WCD establishing a connection in one of the coverage areas associated with a higher-quality codec increases as compared to the likelihood of the WCD establishing a connection in one of the coverage areas associated with a comparatively lower-quality codec.

17. A non-transitory computer readable medium having stored therein instructions that are executable to cause a radio access network (RAN) to perform functions comprising:
   determining a codec that is associated with a wireless communication device (WCD) in a given coverage area of a radio access network (RAN), wherein the RAN is configured to determine which codec is assigned to the WCD in the coverage area when the WCD establishes a connection in the given coverage area;
   using the associated codec as a basis for determining a setting for each of one or more access parameters that affect a likelihood of a successful connection by the WCD in the given coverage area when using the one or more access parameters in an access process, wherein the setting for each of the one or more access parameters is determined such that the likelihood of a successful connection in the given coverage area is affected in a manner correlated to quality of the associated codec; and
   causing the WCD to operate according to the determined settings for the one or more access parameters.

18. The computer readable medium of claim 17, wherein determining the setting for each of the one or more access parameters comprises determining an initial transmit power for access probes sent by the WCD.

19. The computer readable medium of claim 17, wherein determining the setting for each of the one or more access parameters comprises:
   determining a maximum number of access probes per access-probe cycle; and
   setting a maximum-probe-number parameter to the determined maximum number.

20. A wireless communication device (WCD) comprising:
   a non-transitory computer readable medium;
   program instructions stored on the non-transitory computer readable medium an executable by at least one processor to:
      determine a codec that is associated with the WCD in a given coverage area of a radio access network (RAN), wherein the RAN is configured to determine which codec is assigned to the WCD in the coverage area when the WCD establishes a connection in the given coverage area;
      use the associated codec as a basis for determining a setting for each of one or more access parameters that affect a likelihood of a successful connection by the WCD in the given coverage area when using the one or more access parameters in an access process, wherein the setting for each of the one or more access parameters is determined such that the likelihood of a successful connection in the given coverage area is affected in a manner correlated to a relative quality of the associated codec; and
      cause the WCD to operate according to the determined settings for the one or more access parameters.

* * * * *